United States Patent [19]

Iggulden et al.

[11] Patent Number: 4,916,739
[45] Date of Patent: Apr. 10, 1990

[54] ADHESIVE PHOTOCOPYABLE TRANSPARENCY FOR USE IN A SECURE FACSIMILE TRANSMISSION SYSTEM

[75] Inventors: Jerry R. Iggulden, 21600 Cleardale St., Santa Clarita, Calif. 91321; Donald A. Streck, 832 Country Dr., Ojai, Calif. 93023

[73] Assignees: Jerry R. Iggulden, Santa Clarita; Donald A. Streck, Ojai, both of Calif. ; a part interest

[21] Appl. No.: 326,975

[22] Filed: Mar. 22, 1989

Related U.S. Application Data

[63] Continuation-in-part of Ser. No. 312,700, Feb. 21, 1989, which is a continuation-in-part of Ser. No. 175,947, Mar. 31, 1988, abandoned.

[51] Int. Cl.⁴ .............................................. G09C 5/00
[52] U.S. Cl. ...................................... 380/54; 380/14; 380/18
[58] Field of Search .................... 380/14, 18, 54, 55, 380/59

[56] References Cited

U.S. PATENT DOCUMENTS

| | | | |
|---|---|---|---|
| 2,417,163 | 3/1947 | Horst | 380/54 |
| 2,437,255 | 3/1948 | Hogan et al. | 380/54 |
| 2,795,705 | 6/1957 | Rabinow | 380/54 X |
| 2,914,603 | 11/1959 | Gabriel | 380/54 |
| 2,952,080 | 9/1960 | Avakian et al. | 380/54 |
| 3,084,453 | 4/1963 | Brown | 380/54 |
| 3,156,051 | 11/1964 | Hughes et al. | 380/54 |
| 3,234,663 | 2/1966 | Ferris et al. | 380/54 |
| 3,279,095 | 10/1966 | Carlson | 380/54 |
| 3,621,589 | 11/1971 | Jones et al. | 380/54 |
| 3,914,877 | 10/1975 | Hines | 380/54 |
| 4,586,711 | 5/1986 | WInters et al. | 380/54 X |
| 4,682,954 | 7/1987 | Cook | 380/54 |
| 4,776,013 | 10/1988 | Kafri et al. | 380/54 |

Primary Examiner—Stephen C. Buczinski
Assistant Examiner—Bernarr E. Gregory
Attorney, Agent, or Firm—Donald A. Streck

[57] ABSTRACT

An adhesive photocopyable transparency for use in a secure facsimile transmission system wherein one of two partial documents each containing portions of an original document which are complementary and mutually exclusive is photocopied onto the transparency and overlayed on the other of the two partial documents in registration therewith to recreate the original document. There is a rectangular sheet of a transparent plastic material having a surface for accepting and holding a photocopy image. An adhesive material is disposed at an edge of the sheet of plastic material and a removable protective covering is disposed over the adhesive material so as to allow the transparency to pass freely through a photocopy machine and be slid on the surface of a document without the adhesive material interfering therewith. After photocopying the one of two partial documents onto the transparency and placing it in registration on the other of the two partial documents the protective covering are removed in place to bond the transparency to the one of the two partial documents.

15 Claims, 3 Drawing Sheets

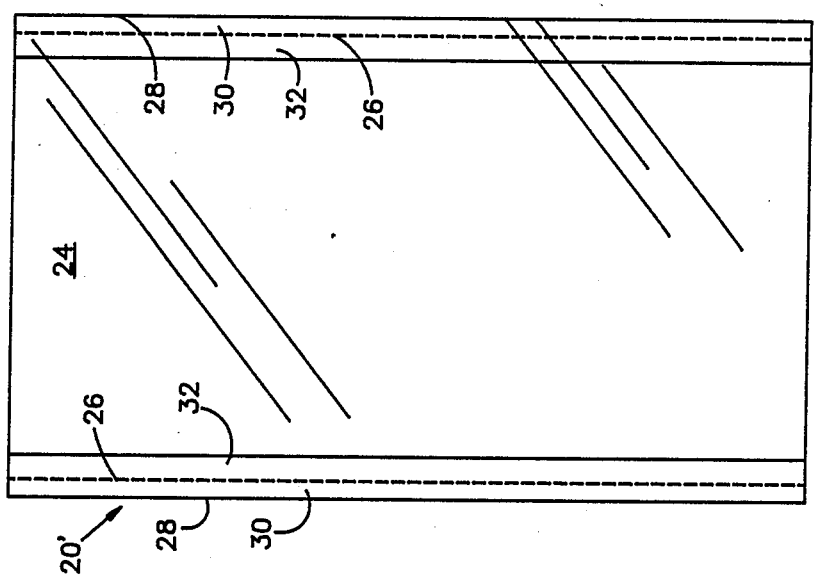
FIG. 10
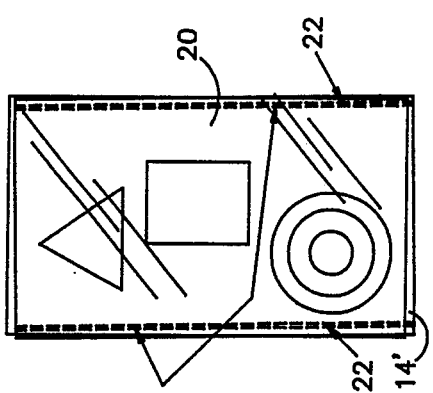
FIG. 9
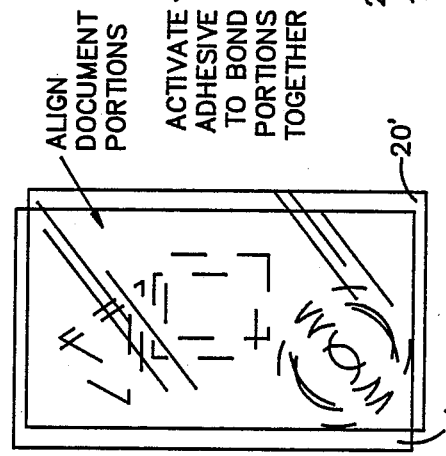
FIG. 8
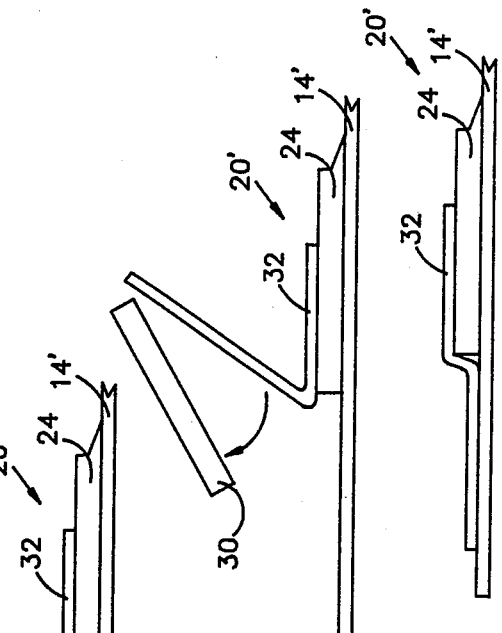
FIG. 11
FIG. 12
FIG. 13

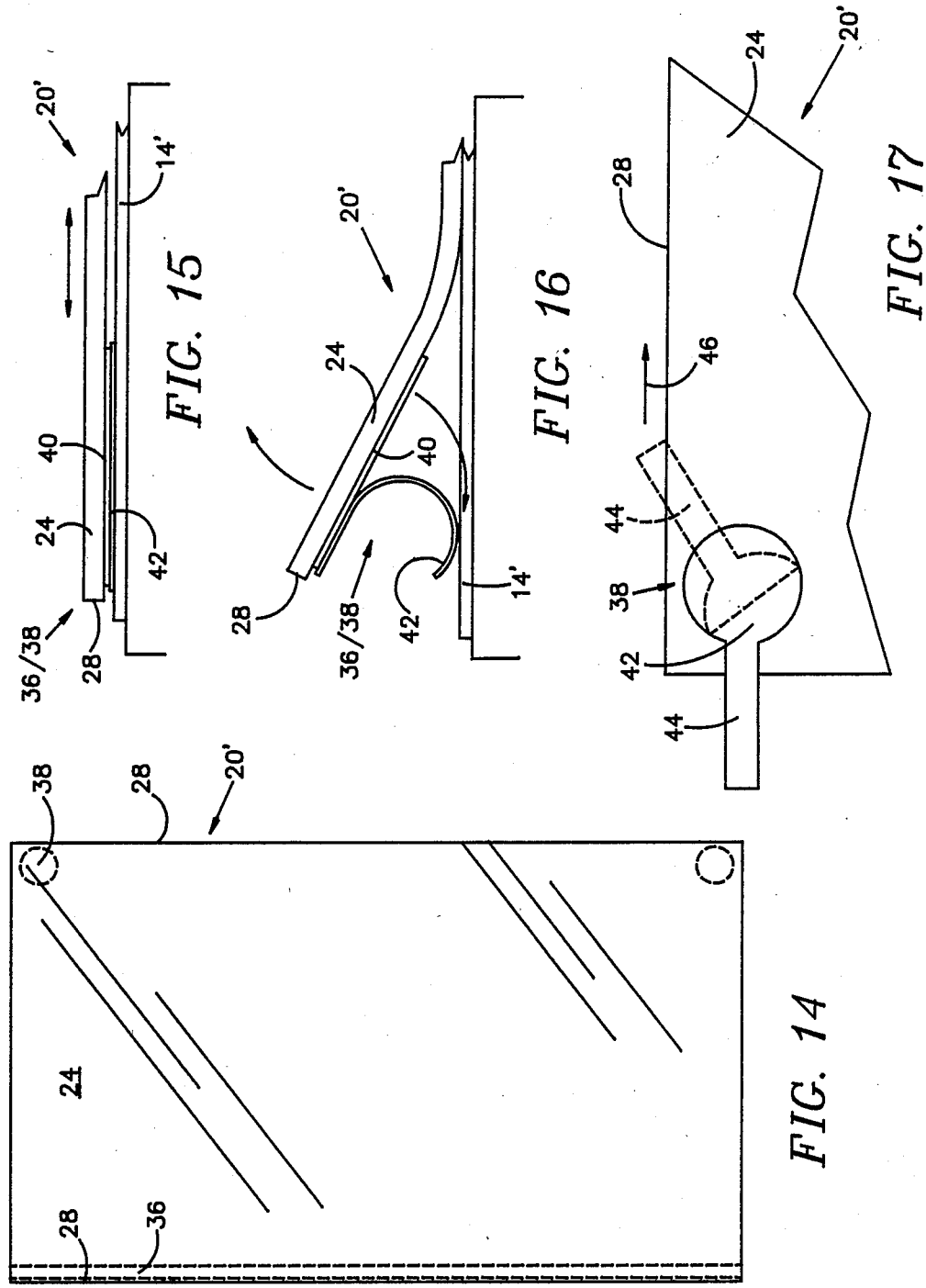

ADHESIVE PHOTOCOPYABLE TRANSPARENCY FOR USE IN A SECURE FACSIMILE TRANSMISSION SYSTEM

BACKGROUND OF THE INVENTION

This application is a continuation-in-part of application Ser. No. 312,700, filed 21 Feb. 1989 which, in turn, in a continuation-in-part of application Ser. No. 175,947, filed 31 Mar. 1988, now abandoned.

This invention relates to facsimile transmission systems and methods for sending a document between a sender and a receiver by facsimile in a manner which prevents unauthorized casual reading of the document, and, more particularly, to an adhesive photocopyable transparency for use in a secure facsimile transmission system wherein one of two partial documents each containing portions of an original document which are complementary and mutually exclusive is photocopied onto the transparency and overlayed on the other of the two partial documents in registration therewith to recreate the original document, the transparency comprising, a rectangular sheet of a transparent plastic material having a surface for accepting and holding a photocopy image; an adhesive material disposed at an edge of the sheet of plastic material; and, a removable protective covering disposed over the adhesive material so as to allow the transparency to pass freely through a photocopy machine and be slid on the surface of a document without the adhesive material interfering therewith whereby after photocopying the one of two partial documents onto the transparency and placing it in registration on the other of the two partial documents the protective covering can be removed in situ to bond the transparency to the one of the two partial documents.

In above-referenced, co-pending '700 application, the teachings of which are incorporated herein by reference, a method and associated apparatus is disclosed by means of which a document can be transmitted between a sender and a receiver by facsimile in a manner which prevents unauthorized casual reading of the document. The method and an associated mechanical apparatus for practicing the method are shown in simplified form in FIGS. 1-5. As depicted in FIGS. 1 and 2, a pair of patterns 10 and 12 are alternately placed over the document 14 while it is scanned (either by a photocopy machine or the scanning head of a facsimile machine). Each pattern 10, 12 contains white portions 16 on a transparent background thus creating transparent portions 18. The patterns 10, 12 are complementary and mutually exclusive; that is, the "A" pattern 10 of FIG. 1 has white portions 16 where the "B" pattern 12 of FIG. 2 has transparent portions 18, and vice versa. Thus, when the document 14 of FIG. 3 is scanned through the "A" pattern 10 of FIG. 1 the partial document 14' of FIG. 4 is produced. Similarly, when the document 14 of FIG. 3 is scanned through the "B" pattern 12 of FIG. 2 the partial document 14" of FIG. 5 is produced. The two partial documents 14', 14" are then transmitted by facsimile to the receiver. At the receiving end, the two partial documents 14', 14" are difficult to read and understand, at least to the casual observer. As depicted in FIGS. 6 and 7, to "read" the original document the intended receiver makes a copy of one of the two partial documents, 14'", on a transparency 20 and only has to place the transparency 20 over the other partial document, 14', in proper registration in order to view (and copy, if desired) the reconstructed document 14.

Without more, the transparency 20 and partial document 14' can come out of registration, which can be inconvenient for future use by the recipient.

Wherefore, it is the object of this invention to provide a photocopyable transparency for use with the method of the co-pending '700 application which eliminates the loss of registration problem and creates a bonded composite document for the recipient which is convenient to use for various purposes.

Other objects and benefits of this invention will become apparent from the detailed description which follows hereinafter when taken in conjunction with the drawing figures which accompany it.

SUMMARY

The foregoing object has been achieved in a photocopyable transparency comprising a rectangular sheet of a transparent plastic material having a surface for accepting and holding a photocopy image for use in a secure facsimile transmission system wherein one of two partial documents each containing portions of an original document which are complementary and mutually exclusive is photocopied onto the transparency and overlayed on the other of the two partial documents in registration therewith to recreate the original document, by the improvement of the present invention for making the transparency bondable to the other of the two partial documents comprising, an adhesive material disposed at an edge of the sheet of plastic material; and, a removable protective covering disposed over the adhesive material so as to allow the transparency to pass freely through a photocopy machine and be slid on the surface of a document without the adhesive material interfering therewith whereby after photocopying the one of two partial documents onto the transparency and placing it in registration on the other of the two partial documents the protective covering can be removed in situ to bond the transparency to the one of the two partial documents.

In one embodiment, the adhesive material comprises a strip adhesive tape adhesively disposed on a top surface of the sheet of plastic material along a side edge thereof and the sheet of plastic material is frangible along a line disposed under the strip of adhesive tape whereby an outer edge of the sheet of plastic material comprises the removable protective covering and is removable by breaking the sheet of plastic material along the line and peeling the outer edge from the adhesive tape.

In another embodiment, the adhesive material comprises an adhesive material disposed on a bottom surface of the sheet of plastic material at a side edge thereof and the removable protective covering comprises a flexible sheet of material covering the adhesive material and which can be grasped at an edge thereof and peeled from the adhesive material. In one variation, the adhesive material comprises a strip of adhesive material disposed along a side edge of the sheet of plastic material and the removable protective covering comprises a strip of the flexible sheet of material covering the strip of adhesive material. In another variation, the adhesive material comprises a plurality of spots of adhesive material disposed along side edges of the sheet of plastic material and the removable protective covering comprises a plurality of spots of the flexible sheet of material covering respective ones of the spots of adhesive material. In still another variation, the adhesive material comprises a plurality of spots of adhesive material disposed along side edges of the sheet of plastic material and the removable protective covering comprises a strip of the flexible sheet of material covering the plurality of the spots of adhesive material. In this embodiment, it is preferred that there is a pull tab extending outward from the removable protective covering for gripping to peel the removable protective covering from the adhesive material.

DESCRIPTION OF THE DRAWINGS

FIGS. 8 and 9 are simplified drawings showing additional steps to the method added by this continuation-in-part application.

FIG. 10 is a simplified top view of a photocopyable transparency according to a preferred embodiment of this application.

FIGS. 11-13 are simplified drawings showing the manner in which the edges of the photocopyable transparency of FIG. 10 are broken off along pre-established break lines formed therein to expose adhesive strips which are used to adhesively attach the transparency to the partial document with which it is in registration.

FIG. 14 is a simplified top view of a photocopyable transparency employing alternate embodiments of adhesive attachments.

FIGS. 15 and 16 are simplified drawings showing the manner in which the protective covering of adhesive strips employed in the embodiments of FIG. 14 is removed to expose the adhesive which is used to adhesively attach the transparency to the partial document with which it is in registration.

FIG. 17 is a simplified drawing showing a preferred addition to the embodiments of FIGS. 14-16.

DESCRIPTION OF THE PREFERRED EMBODIMENT

Figure 5:
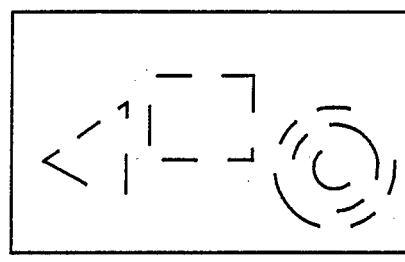
FIG. 5 is a simplified drawing of a partial document produced for facsimile transmission when scanned through the pattern of FIG. 2.
Figure 4:
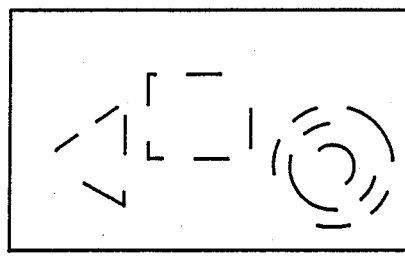
FIG. 4 is a simplified drawing of a partial document produced for facsimile transmission when scanned through the pattern of FIG. 1.
Figure 3:
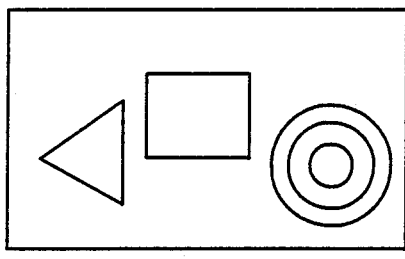
FIG. 3 is a simplified drawing of an exemplary document being sent in an example of the operation of the invention of which this is a continuation-in-part
Figure 2:
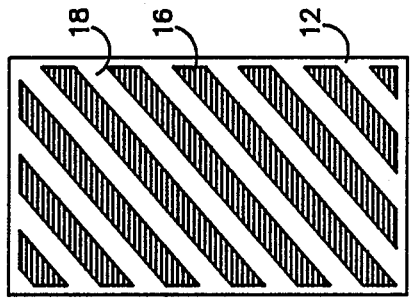
FIG. 2 is a simplified drawing of a "B" pattern as employed in practicing the invention of which this is a continuation-in-part in combination with the complementary and mutually exclusive "A" pattern of FIG. 1.
Figure 1:
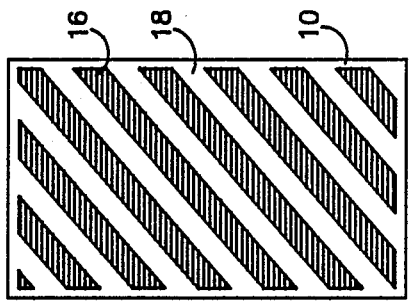
FIG. 1 is a simplified drawing of an "A" pattern as employed in practicing the invention of which this is a continuation-in-part.
Figure 7:
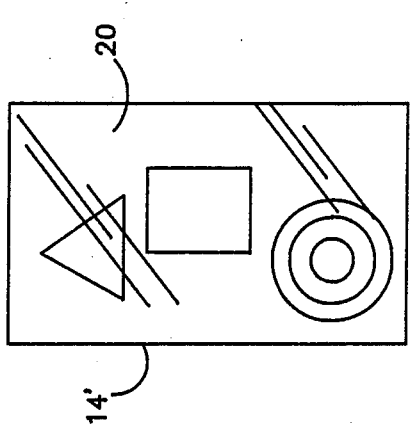
FIG. 7 is a simplified drawing of the transparency of FIG. 6 placed in registration over the partial document of FIG. 4 to recreate the document of FIG. 3.
Figure 6:
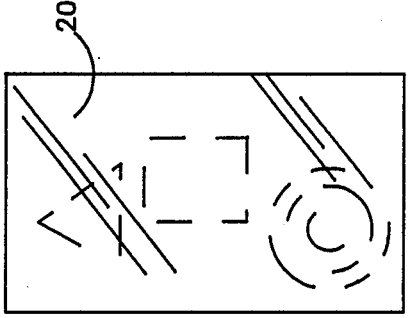
FIG. 6 is a simplified drawing of a transparency of the partial document of FIG. 5 which is produced when practicing the method of this continuation-in-part application of the co-pending '700 patent application.

The method of the above-referenced, co-pending '700 application of which this is a continuation-in-part is extended to achieve the stated object by the additional steps depicted in FIGS. 8 and 9. The partial document 14' is placed on a solid surface with the transparency 20' of this application (to be described shortly) on top of it and the two aligned into proper registration. While pressing down on the partial document 14' and transparency 20' to hold them in registration, an adhesive 22 is activated to bond the partial document 14' and transparency 20' together against further relative movement.

The preferred adhesive photocopyable transparency 20' of this application is shown in FIG. 10. The transparency 20' comprises a rectangular sheet of a photocopyable plastic material 24 of a type well known in the art for such purposes. The plastic material 24 has score lines 26 formed along the side edges 28 and parallel thereto. The score lines are located about ¼ to ⅜ inch from the edges 28 and can be formed by any of several well known manufacturing techniques well known in the art such as mechanical scoring or laser cutting. The strips 30 between the score lines 26 and the edges 28 and a portion on the inner sides of the score lines 26 have a thin, transparent, adhesive tape 32 applied thereto. Thus, the transparency 20' will feed through a typical photocopy machine without problem.

In use, when the transparency 20' has been placed in registration on the partial document 14' and the two are being held together as described above, the strips 30 are lifted as depicted by the arrow 34 in FIG. 11 to break the transparency 20' along the score line 26. The tape 32 is then folded back as depicted in FIG. 12 and the strips 30 peeled therefrom. The tape 32 is then used to adhesively attach the transparency 20' to the document portion 14' as depicted in FIG. 13.

The adhesive 22 of FIG. 9 can also take other forms as depicted in FIGS. 14-16. Since the plastic material 24 used for such photocopyable transparencies is quite thin, it can be rolled back at the corners and/or along the edges 28, for example, to activate an adhesive strip 36 or spot 38. In this embodiment, the score lines 26 are unnecessary. A two-sided adhesive material 40 has its protective covering (not shown) removed and it is adhesively attached with its exposed adhesive surface to the bottom of the plastic material 24 in a desired position. The other protective covering 42 is left on. Again, using thin materials for the adhesive material 40 and remaining protective covering 42, the transparency 20' should pass through a typical photocopy machine without incident. As depicted in FIG. 17, with this approach it is preferred that the protective covering 42 have a tab 44 extending outward therefrom which can be grasped and pulled as indicated by the ghosted position and arrow 46 of the drawing figure. A string, or the like, could also be attached to the edge of the protective covering 42 to function in the manner of the tab 44. When copying onto the transparency 20', the tab 44 should face towards the bottom of the transparency 20' as it passes through the photocopy machine so as not to catch and cause a jam. With the tab 44, the edge of the transparency 20' does not have to be lifted as high in order to remove the protective covering 42 from the adhesive material 40. When the transparency 20' is positioned over the partial document 14' and with the two held together, the tab 44 is simply grasped and pulled to pull the protective covering 42 off the adhesive material 42 and out from between the transparency 20' and the partial document 14' so that the adhesive material 42 can bind the two together. As those skilled in the art will readily appreciate, a plurality of spots 38 of the adhesive material 42 could be disposed along one (or both) of the side edges 28 of the transparency 20' to be covered by a single strip of the protective covering 42. For example, four spots 38 could be placed in the four corners of the transparency 20' will one pull strip of the protective covering 42 along the top edge and another along the bottom edge.

Wherefore, having thus described our invention, what is claimed is:

1. An adhesive photocopyable transparency for use in a secure facsimile transmission system wherein one of two partial documents each containing portions of an original document which are complementary and mutually exclusive is photocopied onto the transparency and overlayed on the other of the two partial documents in registration therewith to recreate the original document, said transparency comprising:
   (a) a rectangular sheet of a transparent plastic material having a surface for accepting and holding a photocopy image;
   (b) an adhesive material disposed at an edge of said sheet of plastic material; and,
   (c) a removable protective covering disposed over said adhesive material so as to allow the transparency to pass freely through a photocopy machine and be slid on the surface of a document without said adhesive material interfering therewith thereby after photocopying the one of two partial documents onto the transparency and placing it in registration on the other of the two partial documents said protective covering can be removed in place to bond the transparency to the one of the two partial documents.

2. The adhesive photocopyable transparency of claim 1 wherein:
   (a) said adhesive material comprises a strip adhesive tape adhesively disposed on a top surface of said sheet of plastic material along a side edge thereof; and,
   (b) said sheet of plastic material is frangible along a line disposed under said strip of adhesive tape whereby an outer edge of said sheet of plastic material comprises said removable protective covering and is removable by breaking said sheet of plastic material along said line and peeling said outer edge from said adhesive tape.

3. The adhesive photocopyable transparency of claim 1 wherein:
   (a) said adhesive material comprises an adhesive material disposed on a bottom surface of said sheet of plastic material at a side edge thereof; and,
   (b) said removable protective covering comprises a flexible sheet of material covering said adhesive material and which can be grasped at an edge thereof and peeled from said adhesive material.

4. The adhesive photocopyable transparency of claim 3 wherein:
   (a) said adhesive material comprises a strip of adhesive material disposed along a side edge of said sheet of plastic material; and,
   (b) said removable protective covering comprises a strip of said flexible sheet of material covering said strip of adhesive material.

5. The adhesive photocopyable transparency of claim 3 wherein:
   (a) said adhesive material comprises a plurality of spots of adhesive material disposed along side edges of said sheet of plastic material; and,
   (b) said removable protective covering comprises a plurality of spots of said flexible sheet of material covering respective ones of said spots of adhesive material.

6. The adhesive photocopyable transparency of claim 3 wherein:
   (a) said adhesive material comprises a plurality of spots of adhesive material disposed along side edges of said sheet of plastic material; and,
   (b) said removable protective covering comprises a strip of said flexible sheet of material covering said plurality of said spots of adhesive material.

7. The adhesive photocopyable transparency of claim 3 and additionally comprising:
   a pull tab extending outward from said removable protective covering for gripping to peel said removable protective covering from said adhesive material.

8. In a photocopyable transparency comprising a rectangular sheet of a transparent plastic material having a surface for accepting and holding a photocopy image for use in a secure facsimile transmission system wherein one of two partial documents each containing portions of an original document which are complementary and mutually exclusive is photocopied onto the transparency and overlayed on the other of the two partial documents in registration therewith to recreate the original document, the improvement for making said transparency bondable to the other of the two partial documents comprising:
   (a) an adhesive material disposed at an edge of the sheet of plastic material; and,
   (b) a removable protective covering disposed over said adhesive material so as to allow the transparency to pass freely through a photocopy machine and be slid on the surface of a document without said adhesive material interfering therewith whereby after photocopying the one of two partial documents onto the transparency and placing it in registration on the other of the two partial documents said protective covering can be removed in place to bond the transparency to the one of the two partial documents.

9. The improvement to a photocopyable transparency of claim 8 wherein:
   (a) said adhesive material comprises a strip adhesive tape adhesively disposed on a top surface of the sheet of plastic material along a side edge thereof; and,
   (b) the sheet of plastic material is frangible along a line disposed under said strip of adhesive tape whereby an outer edge of the sheet of plastic material comprises said removable protective covering and is removable by breaking the sheet of plastic material along said line and peeling said outer edge from said adhesive tape.

10. The improvement to a photocopyable transparency of claim 8 wherein:
    (a) said adhesive material comprises an adhesive material disposed on a bottom surface of the sheet of plastic material at a side edge thereof; and,
    (b) said removable protective covering comprises a flexible sheet of material covering said adhesive material and which can be grasped at an edge thereof and peeled from said adhesive material.

11. The improvement to a photocopyable transparency of claim 10 wherein:
    (a) said adhesive material comprises a strip of adhesive material disposed along a side edge of the sheet of plastic material; and, (b) said removable protective covering comprises a strip of said flexible sheet of material covering said strip of adhesive material.

12. The improvement to a photocopyable transparency of claim 10 wherein:
    (a) said adhesive material comprises a plurality of spots of adhesive material disposed along side edges of the sheet of plastic material; and,
    (b) said removable protective covering comprises a plurality of spots of said flexible sheet of material covering respective ones of said spots of adhesive material.

13. The improvement to a photocopyable transparency of claim 10 wherein:
    (a) said adhesive material comprises a plurality of spots of adhesive material disposed along side edges of the sheet of plastic material; and,
    (b) said removable protective covering comprises a strip of said flexible sheet of material covering said plurality of said spots of adhesive material.

14. The improvement to a photocopyable transparency of claim 10 and additionally comprising:
    a pull tab extending outward from said removable protective covering for gripping to peel said removable protective covering from said adhesive material.

15. In a method for sending a document between a sender and a receiver by facsimile in a manner which prevents unauthorized casual reading of the document wherein the method comprises the steps of:
    at the sender;
    spatially dividing the document into at least two portions each containing mutually exclusive parts of the document chosen such that each of the portions is independently unrecognizable for casual reading purposes, and
    transmitting the portions to the receiver by facsimile transmission one after the other; and,
    at the receiver;
    receiving the portions;
    photocopying one of the portions onto a transparency, and
    overlaying the transparency copy portion onto the other portion in spatial registration to reconstruct a facsimile of the document in a recognizable and readable form, the improvement comprising the additional steps of:
    (a) applying an adhesive material to the transparency to be used for photocopying the one of the portions;
    (b) covering the adhesive material with a removeable protective covering; and after the step of photocopying one of the portions onto the transparency,
    (c) overlaying the transparency copy portion onto the other portion in spatial registration with the adhesive material adjacent to the other portion; and,
    (d) removing the protective covering from the adhesive material to bond the transparency copy portion to the other portion.

* * * * *